May 7, 1929.  W. G. MINGO ET AL  1,712,154
WINDSHIELD HEATER
Filed Dec. 21, 1927
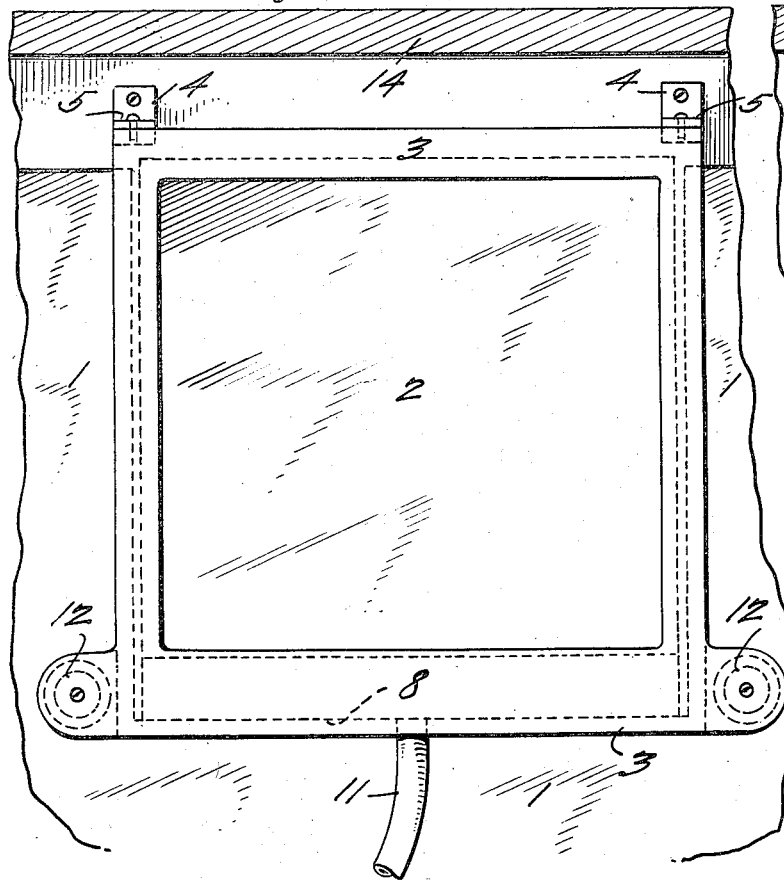
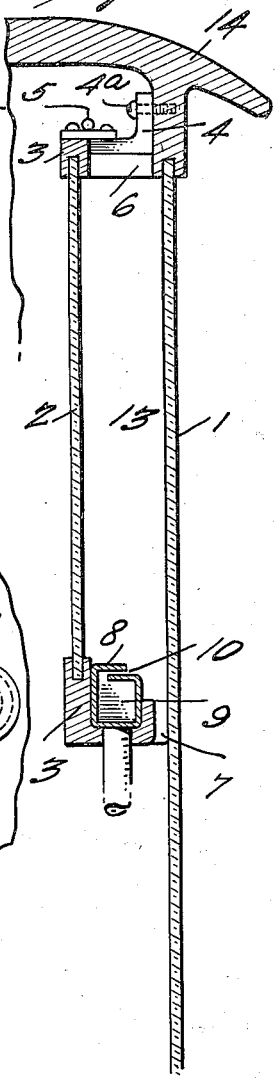
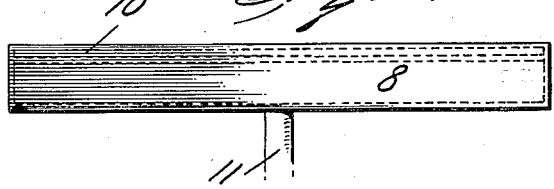
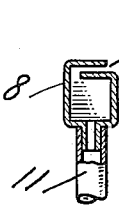
Inventors:
Walter G. Mingo & William B. Rich,
By Franks. Ackerman.
Attorney Patented May 7, 1929.

1,712,154

UNITED STATES PATENT OFFICE.

WALTER G. MINGO, OF SOUTHBORO, AND WILLIAM B. RICH, OF BROOKLINE, MASSACHUSETTS.

WINDSHIELD HEATER.

Application filed December 21, 1927. Serial No. 241,586.

This invention relates to windshield heaters, and particularly to a device intended for use in preventing accumulation of snow, sleet or ice on the windshields of automobiles.

It is an object of this invention to provide novel means for effectively circulating air in contact with and in proximity to a windshield, and for heating said air, when that result is desirable. It often occurs that the circulation of unheated air will effectively prevent the stated accumulations on windshields, but, under other conditions, it becomes necessary to increase the temperature of the air in order that satisfactory results may be attained. Hence, the invention includes means for heating the said air that is circulated in contact with and in proximity to the windshield.

It is a further object of this invention to provide a windshield heater, associated with novel mountings by which it can be expeditiously installed in an automobile and held in operative position with relation to the windshield; and it is furthermore an object of the invention to provide a device of the character indicated which is comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a windshield heater embodying the invention in relation to the windshield;

Figure 2 illustrates a sectional view of the windshield and the heater;

Figure 3 illustrates a view in elevation, partly in section, of the heating element; and Figure 4 illustrates a sectional view thereof at right angles to that shown in Fig. 3.

In the present embodiment of the invention, as illustrated, 1 denotes the windshield, 2 a transparent element, such as glass, in spaced relation to the windshield and preferably mounted in the frame 3. The frame is supported or mounted back of the windshield through the employment of brackets 4, in the nature of angle irons, whose vertically disposed portions are secured in place by anchoring elements 4ª, such as screws, or the like. The frame 3 is movably mounted with respect to the brackets and the windshield through the employment of hinges 5 which are anchored to the brackets 4, as shown, and, hence, the lower end of the frame may be swung outwardly with relation to the windshield and upwardly.

The frame is therefore mounted in spaced relation to the windshield, and a passage 6 is formed between the frame and the windshield or its mounting to permit the escape of air at the top of the frame. A duct or opening 7 is also formed between the frame and the windshield at the bottom, and this permits air to enter the space between the frame and windshield in order that the air may freely circulate in the space back of the windshield and in contact with the windshield.

A metal casing 8 is seated on the angularly disposed lower member of the frame and it has a heat circulating space 9 communicating with an opening or slot 10 at the top of the heater through which heated air escapes into the space back of the windshield. The metal casing, as shown, has oppositely disposed flanges at the top, one of which extends beyond the edge of the other in spaced relation to each other whereby a duct is formed through which the heating agent escapes, and the relation of parts is such that the heating agent is directed from the interior to the exterior of the casing in the direction of the windshield to which the device is attached. The heater may be in communication with a housing or heat collector, associated with the manifold of an internal combustion engine, or the heat may be derived from other sources, so that the inventors do not wish to be limited with respect to the source of the heat. It is sufficient for a disclosure of this invention to indicate that heat circulates through the pipe 11 to the heater and then escapes into the space between the windshield and the transparent element 2.

The lower element of the frame 3 is also provided with anchoring devices, such as suction cups 12, which may be carried by the said member and coact with the inner surface of the windshield in a well known manner, so that when the suction cups are anchored, the frame will be prevented from oscillating.

It is shown in the drawing that the space 13 exists between the windshield and the transparent element 2 and that the duct 7 communicates therewith, whereas the space 6 at the top of the frame insures free circulation of the air which, of course, becomes heated through the escape of the heated air at the location 10. The device is to be mounted on the top frame or other rigid structure, such as 14, of an automobile.

It will be observed from an inspection of the drawing that if the pipe 11 is disconnected from the heater, the said heater may be lifted from its seat, or the frame may be removed from the brackets, or the brackets may be dislodged from the interior of the automobile during such seasons as exist when the action of the heater is not necessary or desirable.

We claim:

1. In a windshield heater, a frame having a transparent element therein, brackets adapted to be attached to the interior of an automobile, means for hingedly connecting the frame to the brackets, the said frame having the lower element approximately L-shape in cross section constituting a seat for a heater, the edge of said element near the windshield being shaped to form a duct back of the windshield, a heat unit having an opening applied to the said seat, means of communication between the heat unit and a source of heat supply, and means for anchoring the lower end of the frame against movement.

2. In a windshield heater, a frame having a transparent element, means for suspending the frame back of a windshield, said frame having a support for a unit, a casing consisting of a pipe angular in cross section with oppositely projecting upper flanges in vertically spaced relation to each other, the flange in the higher plane extending past the edge of the lower flange whereby a duct is formed for directing air from the interior of the casing toward the windshield, and a pipe through which a heating agent is supplied to the said casing.

WALTER G. MINGO.
WILLIAM B. RICH.